(12) United States Patent
Nakano et al.

(10) Patent No.: US 7,143,105 B2
(45) Date of Patent: Nov. 28, 2006

(54) DATABASE SYSTEM

(75) Inventors: Yukio Nakano, Oyama (JP); Yuki Sugimoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 110 days.

(21) Appl. No.: 10/769,888

(22) Filed: Feb. 3, 2004

(65) Prior Publication Data

US 2004/0267782 A1 Dec. 30, 2004

(30) Foreign Application Priority Data

Jun. 30, 2003 (JP) ............................. 2003-187375

(51) Int. Cl.
G06F 17/30 (2006.01)
(52) U.S. Cl. ...................... 707/102; 707/200
(58) Field of Classification Search ................ 707/100, 707/102, 200, 202, 3, 5, 8, 10
See application file for complete search history.

(56) References Cited

U.S. PATENT DOCUMENTS

| | | | |
|---|---|---|---|
| 5,555,404 A | | 9/1996 | Torbjornsen et al. |
| 5,625,811 A | | 4/1997 | Bhide et al. |
| 5,819,295 A | * | 10/1998 | Nakagawa et al. ......... 707/203 |
| 5,970,495 A | | 10/1999 | Baru et al. |
| 6,092,061 A | * | 7/2000 | Choy ........................... 707/1 |
| 6,125,370 A | | 9/2000 | Courter et al. |
| 6,151,608 A | * | 11/2000 | Abrams ...................... 707/204 |
| 6,269,375 B1 | | 7/2001 | Ruddy et al. |
| 6,405,198 B1 | * | 6/2002 | Bitar et al. .................... 707/6 |
| 6,578,039 B1 | * | 6/2003 | Kawamura ................. 707/100 |
| 6,778,996 B1 | * | 8/2004 | Roccaforte ................. 707/101 |
| 2003/0055832 A1 | * | 3/2003 | Roccaforte ................. 707/100 |
| 2003/0195895 A1 | | 10/2003 | Nowicki et al. |
| 2003/0225752 A1 | * | 12/2003 | Bakalash et al. ............. 707/3 |
| 2004/0030703 A1 | | 2/2004 | Bourbonnais et al. |
| 2004/0122845 A1 | | 6/2004 | Lohman et al. |
| 2005/0050050 A1 | | 3/2005 | Kawamura |

FOREIGN PATENT DOCUMENTS

| JP | 2000-067077 | 3/2000 |
|---|---|---|
| JP | 2000-148557 | 5/2000 |

OTHER PUBLICATIONS

Jim Gray and Andreas Reuter, Transaction Processing: pp. 820-821, 1993 Morgan Kaufmann Publishers, Inc.

* cited by examiner

*Primary Examiner*—Don Wong
*Assistant Examiner*—Sheree Brown
(74) *Attorney, Agent, or Firm*—Mattingly, Stanger, Malur & Brundidge, P.C.

(57) ABSTRACT

When a trigger and a method for changing partition definition information have been defined, a DBMS monitors the occurrence of the trigger. When the occurrence of the trigger is detected, a specified partition change is executed automatically. When the partition change is executed, migrations of data among storage areas are executed in parallel as long as the migration source storage area and the migration destination storage area of one piece of the data do not overlap those of another piece of the data.

13 Claims, 13 Drawing Sheets

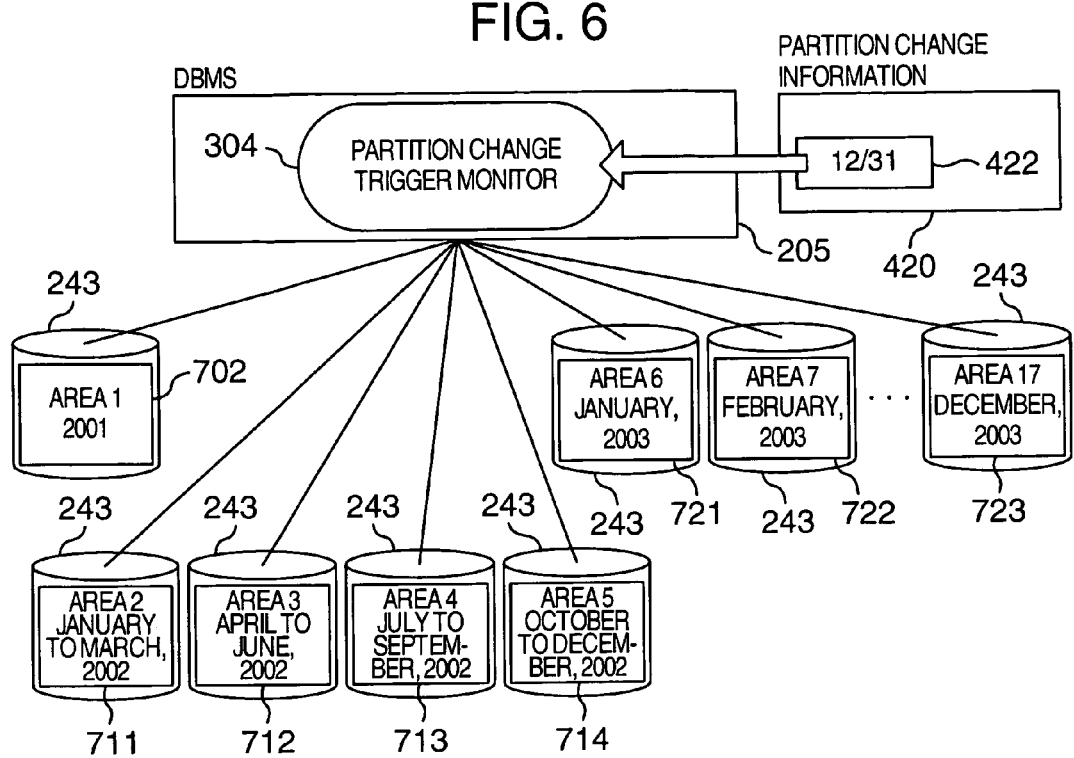
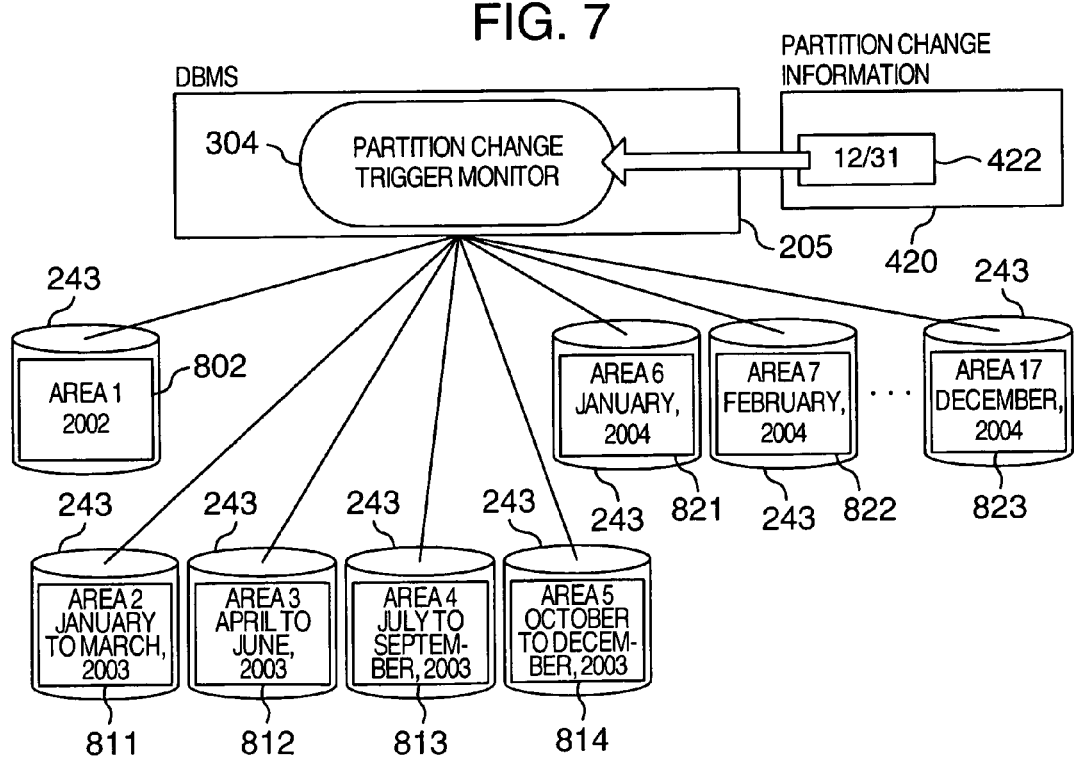

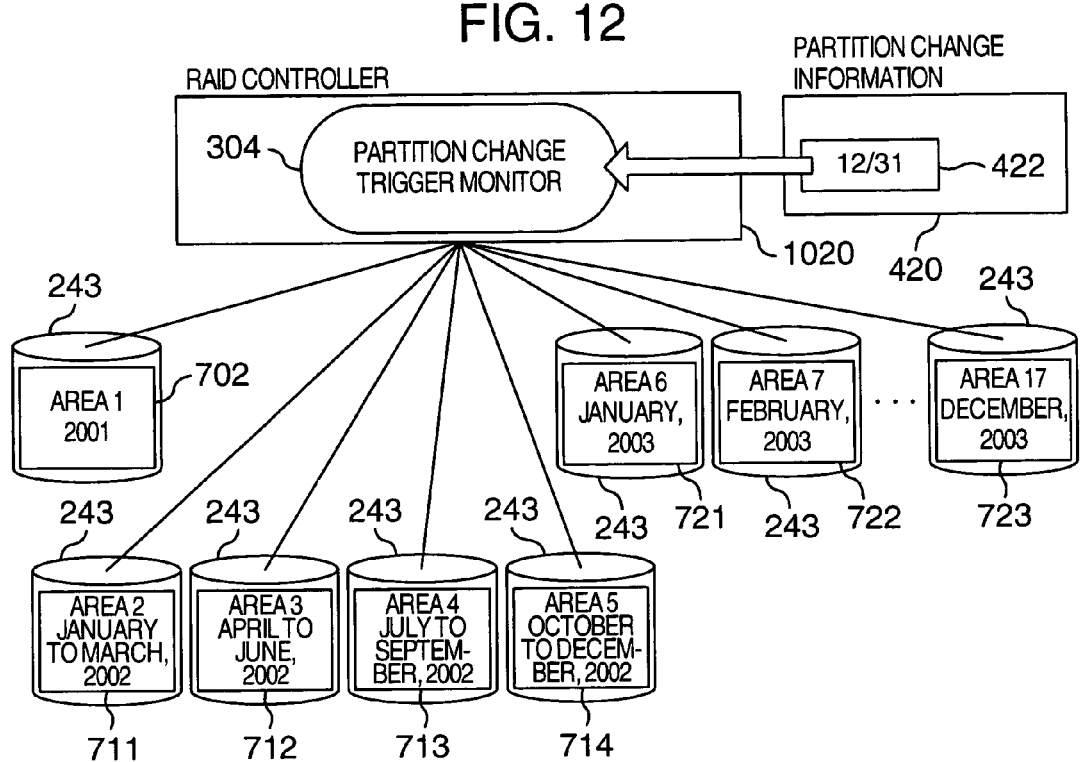
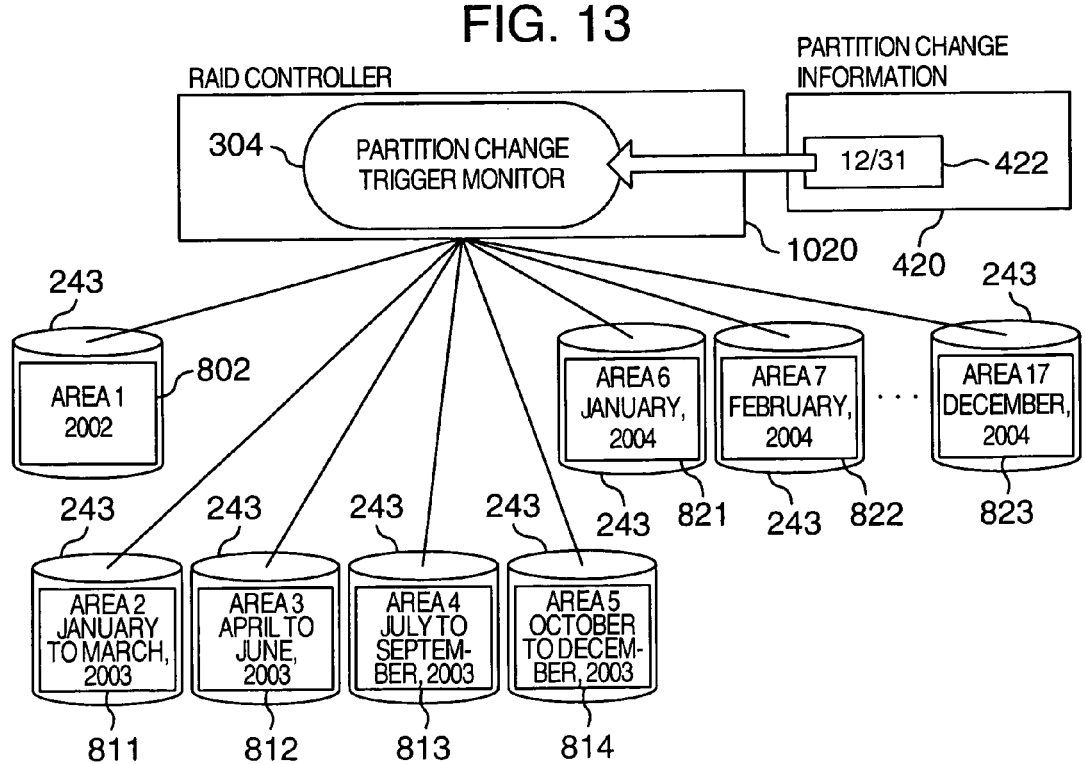

DATABASE SYSTEM

BACKGROUND OF THE INVENTION

The present invention relates to a database system, and particularly relates to a database system processing technique for partitioning a database table based on key range partitioning in a relational database system.

One of database systems is a relational database system, in which a database is constituted by a table that can be observed in a two-dimensional table format by a user, and the table is constituted by a plurality of rows. In addition, each row is constituted by a plurality of columns, and each column has a data type and a data length defining the properties of the column. In the relational database system, the table constituting the database is partitioned and stored to improve the throughput in the system. That is, in the database system, table data are fragmented and stored in a plurality of storage areas (horizontal (row) partitioning of the table) so that the load of accesses to the table can be dispersed. Key range partitioning is often used as the method for partitioning the table. According to key range partitioning, as described above, a range of data to be stored in each storage area as to one column in the table is specified as a condition, and given data is stored in a storage area satisfying the condition and selected based on the value of the data (for example, such a key range partitioning system is disclosed in "TRANSACTION PROCESSING: CONCEPTS AND TECHNIQUES, ISBN 1-55860-190-2, pp.820–821").

Assume that data to be stored in time series, for example, sale history data is fragmented by date and stored. In such a case, in order to effectively use computer resources, unnecessary old data is deleted, and the area where the deleted data had been stored is used for storing new data. In this event, maintenance of partitions and storage areas due to the revision of the ranges of the data requires a management cost because the unnecessary data has to be deleted manually.

There is proposed another table partitioning system in which when a table constituting a relational database is judged necessary to suffer a change of table partitions, changing the table partitions is automated by recursive use of the table to be stored, so as to lighten the burden imposed on a user (for example, JP-A-2000-67077).

Data stored in time series is accessed at frequent intervals at first. However, the access frequency will decrease as time progresses, and finally access will be rarely gained to the data. Thus, according to simple key range partitioning, frequent access to a partition storing new data results in concentration of loads on the partition.

Therefore, in order avoid such a local concentration of loads on a database area, there has been also considered a management method in which data frequently accessed is fragmented into partitions each having a small range, while data infrequently accessed is managed with a large range.

However, in such a management method, when it is necessary to change the table partitions, it is necessary to rearrange the ranges and further migrate stored data in accordance with the rearranged ranges. Thus, a large number of commands are required. That is, in maintenance for partitions and storage areas, it is necessary to execute the following operations in turn; 1) to delete data stored in each unnecessary partition; 2) to delete definitions of the unnecessary partition; 3) to integrate ranges so that data fragmented in partitions each having a small range are rearranged in a partition having a large range; 4) to add a range to store new data; and so on.

In a technique disclosed in JP-A-2000-67077, only the operation to delete partitions and the operation to add partitions are executed automatically, but it is not possible to support the automation of the operation to integrate ranges so that data fragmented in partitions each having a small range are rearranged in a partition having a large range. Thus, a large burden is imposed on a user.

SUMMARY OF THE INVENTION

It is an object of the present invention to provide a technique by which the burden that would be otherwise imposed on a user due to execution of commands can be relieved, and the processing of a change can be performed rapidly.

A database partitioning/storing technique according to the present invention is applied to a database system capable of partitioning and storing data into a plurality of storage areas. The technique includes the steps of acquiring partition conditions including conditions of data partitions specified by relative value and an initial value for the relative values, a partition change trigger, and a partition change method including a changed value of the initial value for the relative values of the partitions specified in the partition conditions, at the time of establishing or changing a table definition; monitoring occurrence of the partition change trigger; and executing a partition change based on the partition change method when the partition change trigger is detected.

According to the aforementioned technique, a specified partition change is executed automatically as soon as the occurrence of the partition change trigger is detected. Thus, the burden imposed on the user can be relieved.

According to the aforementioned technique, in the step of migrating data necessary to migrate from one data storage area to another data storage area includes the step of executing migrations of pieces of data in parallel as long as a migration source storage area and a migration destination storage area of one piece of the data do not overlap those of another piece of the data when a plurality of data migrations are required. Accordingly, as for migrations of data among the storage areas, pieces of data can be migrated in parallel as long as the migration source area and the migration destination area of one piece of the data do not overlap those of another piece of the data. Thus, the processing of the data migrations can be executed efficiently.

BRIEF DESCRIPTION OF THE DRAWINGS

FIG. 6 is a diagram showing the partition condition before the execution of a partition change;

FIG. 7 is a diagram showing the partition condition after the execution of a partition change;

FIG. 12 is a diagram showing the partition condition before the execution of a partition change;

FIG. 13 is a diagram showing the partition condition after the execution of the partition change;

DETAILED DESCRIPTION OF THE EMBODIMENTS

A database system according to the present invention includes a technique in which a data migration point and a migration method are defined in advance, whereupon the occurrence of the data migration point is monitored, and data is migrated, for example, automatically on the basis of the defined data migration method when the data migration point is detected.

Figure 1:
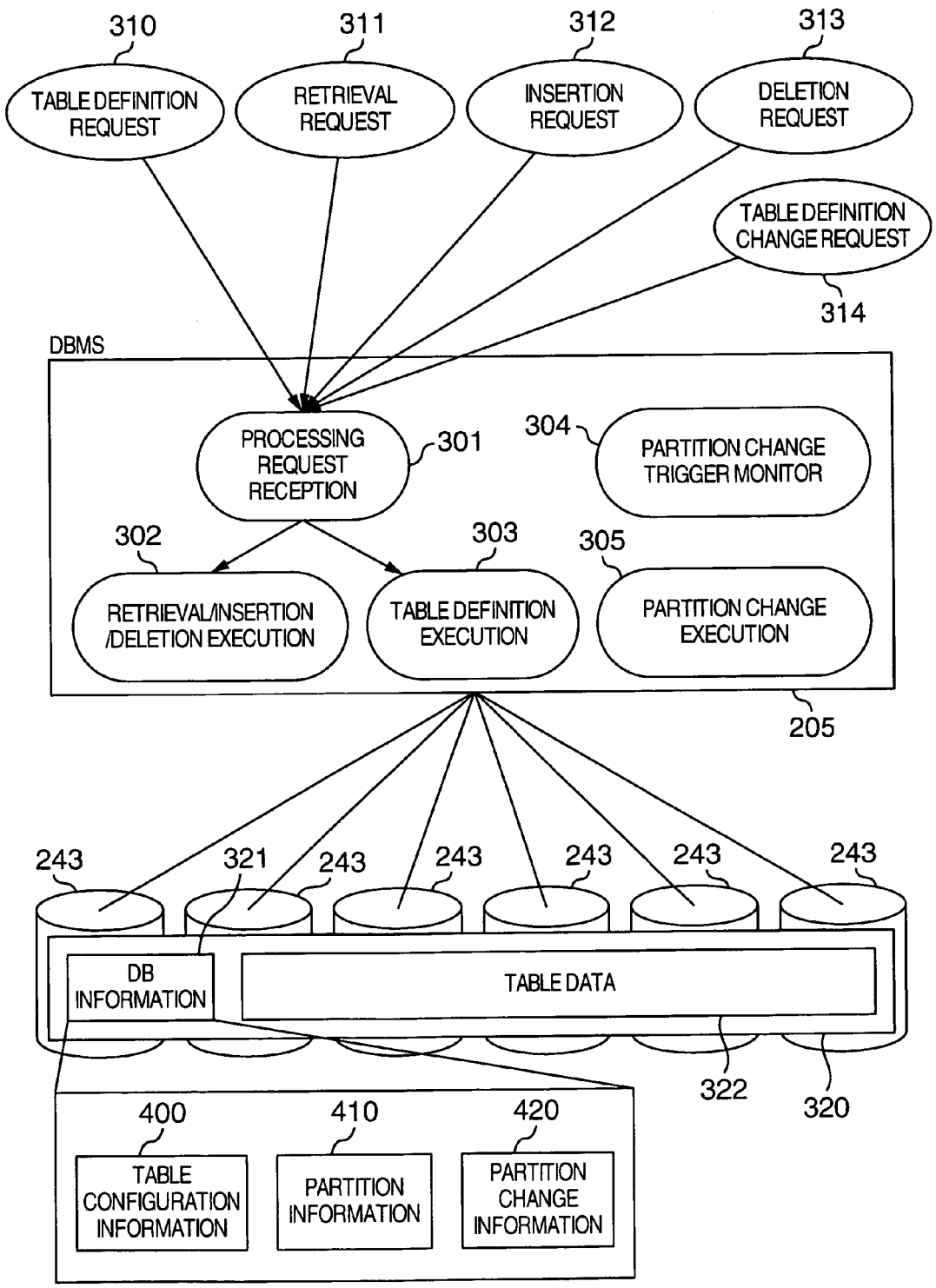
FIG. 1 is a diagram showing an example of the configuration of a database management system using a DBMS (DataBase Management System) according to a first embodiment of the present invention.

With reference to the drawings, description will be made below on a database system according to an embodiment of the present invention. FIG. 1 is a diagram showing an example of the configuration of a DBMS (DataBase Management System) according to an embodiment of the present invention. As shown in FIG. 1, upon acceptance of a processing request such as a table definition request 310, a retrieval request 311, an insertion request 312, a deletion request 313, a table definition change request 314 or the like in a processing request reception 301, a DBMS 205 analyzes the accepted request and executes requested processing. For example, upon acceptance of the table definition request 310 or the table definition change request 314, the DBMS 205 analyzes the accepted request and carries out a requested table definition execution 303. Upon acceptance of the retrieval request 311, the insertion request 312 or the deletion request 313, the DBMS 205 analyzes the accepted request and executes a requested retrieval/insertion/deletion execution 302. The DBMS 205 can accept a plurality of execution requests simultaneously and carry out processing executions for the requests.

A partition change trigger monitor 304 monitors the occurrence of a partition change execution trigger set at the time of defining, or preparation of, a table. When the partition change execution trigger is detected, a specified partition change is executed in a partition change execution 305.

A large number of disk units 243 are associated with the DBMS 205. DB information 321 and table data 322 are stored in DB data 320 provided in the disk units 243. The DB information 321 stores definition information of a table defined by a table definition request. Information specified with the table definition request 310 is divided into table configuration information 400, partition information 410 and partition change information 420, which are stored in the DB information 321. Table data 322 is data stored in the DBMS 205 in accordance with the insertion request 312.

Figure 2:
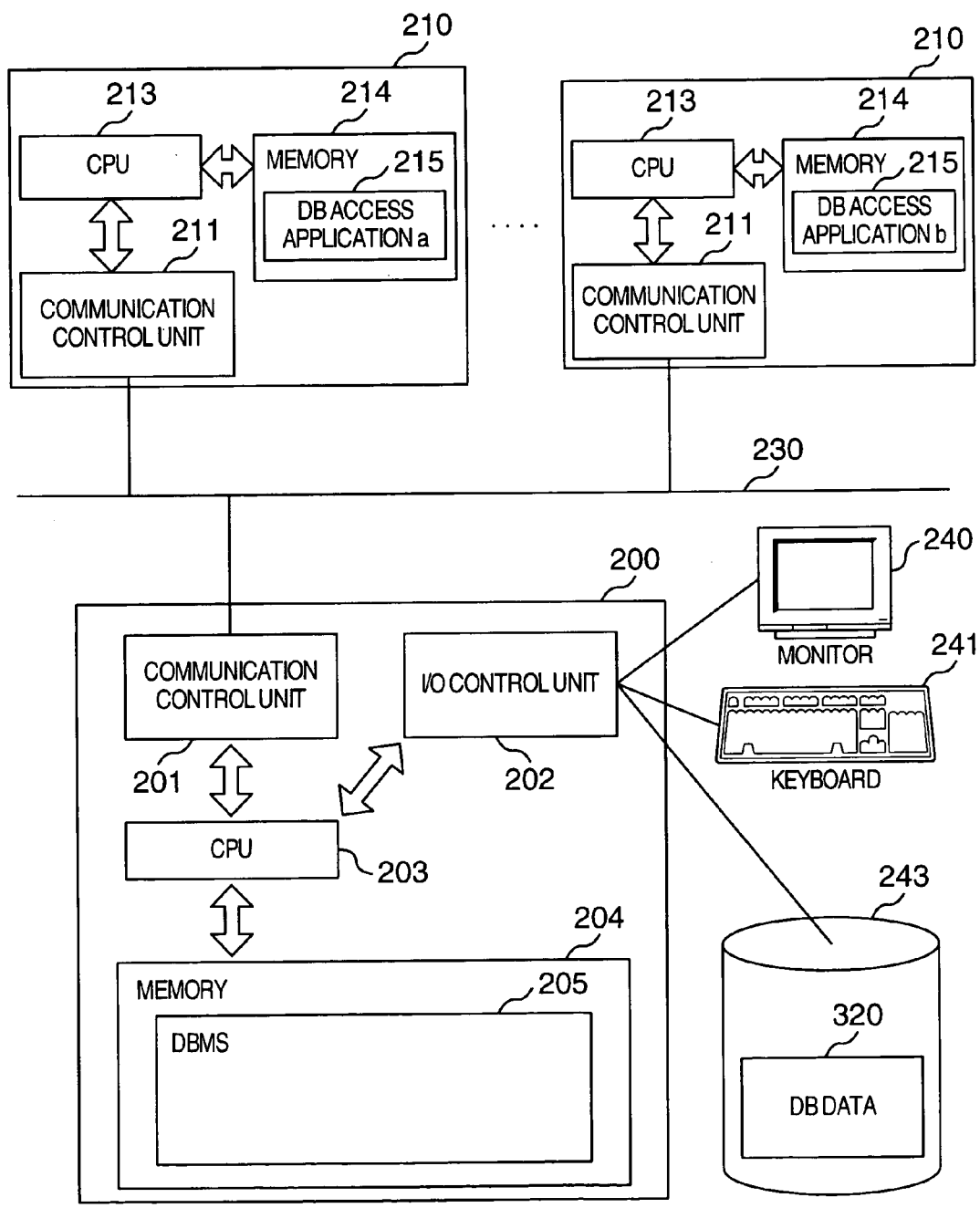
FIG. 2 is a diagram showing an example of the hardware configuration of the management system depicted in FIG. 1.

FIG. 2 is a diagram showing an example of the hardware configuration of the database system according to this embodiment. As shown in FIG. 2, the database system according to this embodiment has a first information processing apparatus 200, and a plurality of pieces of second information processing apparatus 210 associated with the first information processing apparatus 200 via a network 230. The first information processing apparatus 200 includes a central processing unit (CPU) 203, a storage device (memory) 204, an I/O control unit 202 and a communication control unit 201. The CPU 203 executes a program stored in the memory 204 and related to the DBMS 205 so as to perform processing on the DBMS 205. The DB data 320 is read from and written into the disk units 243 by the I/O control unit 202. Under control of the communication control unit 201, the first information processing apparatus transmits/receives data to/from any one piece of the second information processing apparatuses 210 respectively connected to the network 230. In addition, a command to start/stop the DBMS is carried out using a monitor 240 and a keyboard 241 connected to the I/O control unit 202.

Each piece of the second information processing apparatus 210 has a similar configuration, and a DB access application (a, b) 215 stored in a memory 214 is executed. When the DB access application (a, b) 215 makes a query to the DBMS 205, a query request is sent from a communication control unit 211 of the second information processing apparatus 210 to the DBMS 205 through the communication control unit 201 of the first information processing apparatus 200. The DBMS 205 executes processing in accordance with the query request. If there is a necessity of gaining access to the DB data 320, the DBMS 205 gains access to the DB data 320 stored in the disk units 243 through the I/O control unit 202. The result of the access processing is transferred to the communication control unit 211 of the information processing apparatus 210 via the communication control unit 201, and fed back to the DB access application (a, b) 215 of the request source.

Figure 3:
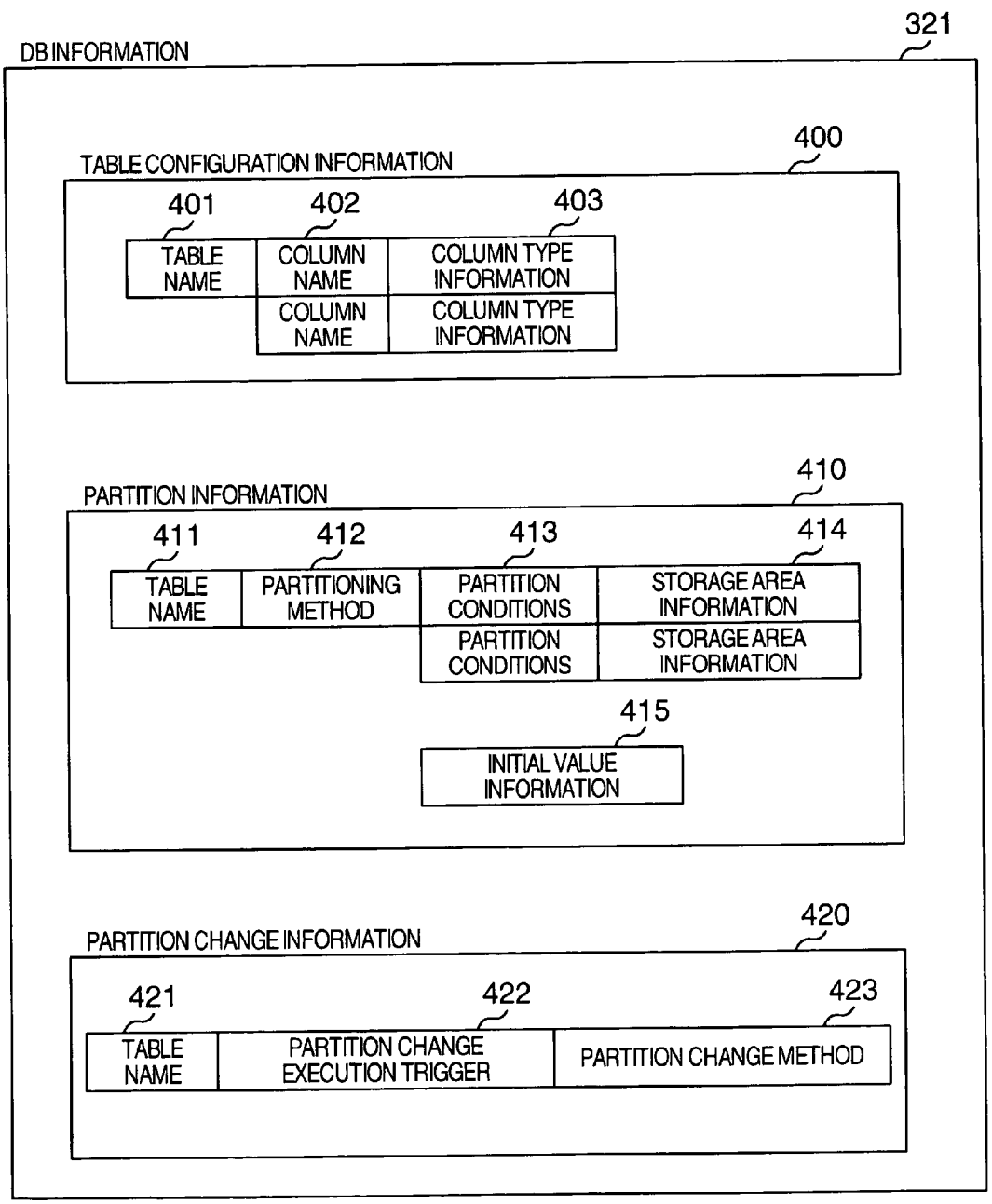
FIG. 3 is a diagram showing an example of the configuration of DB information in the management system depicted in FIG. 1.

With reference to FIG. 1 and FIG. 3 et seq., the processing of the database system according to this embodiment will be described in accordance with each function. First, description will be made on a table definition execution.

As shown in FIG. 1, the processing request reception 301 accepts the table definition request 310 or the table definition change request 314, analyzes the processing request and carries out the table definition execution 303. By the table definition execution 303, the table configuration information 400, the partition information 410 and the partition change information 420 are registered or changed in the DB information 321 of the DB data 320. As shown in FIG. 3, the table configuration information 400 stores basic information constituting the table, including a table name 401, column names 402 and column type information 403.

Figure 5:
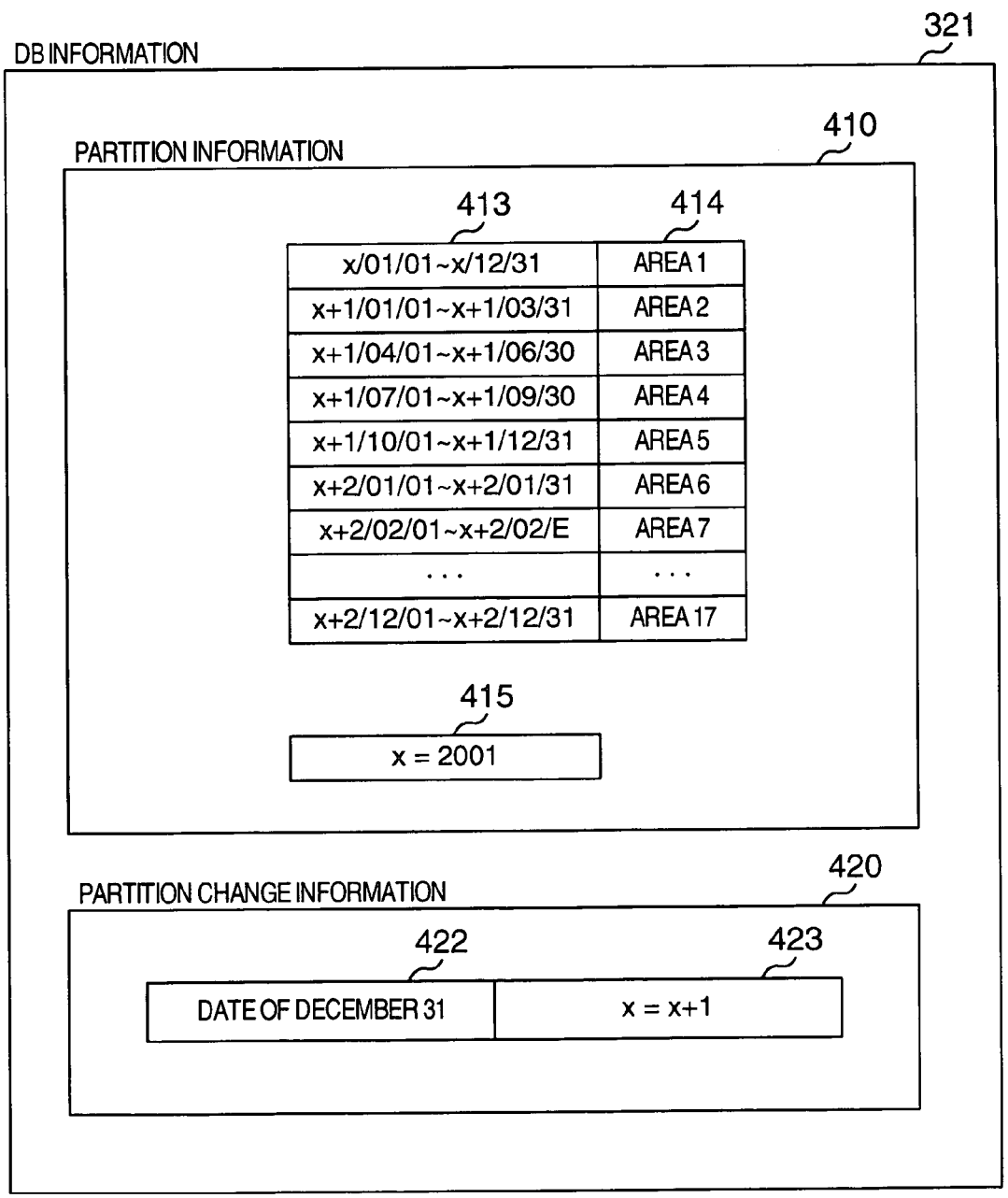
FIG. 5 is a diagram showing an example of definitions of the DB information.

The partition information 410 stores a table name 411, a table partitioning method (area partitioning method) 412, partition conditions 413 and partitioned data storage area information 414. As shown in FIG. 5, the partition conditions 413 are stored, for example, as conditions including conditions of partitions specified by relative values and an initial value for the relative values, and the initial value for the relative values is stored in initial value information 415. That is, as described later, the partition condition 413 is arranged to vary in accordance with a change of the value of the information 415. The partition change information 420 stores a table name 421, a partition change execution trigger 422 and a partition change method 423. The partition change execution trigger 422 stores a trigger with which a partition change will be executed, for example, a specified date and hour, an occasion where a specified storage area is full or an occasion where all the data in a specified storage area are deleted. The partition change method 423 stores how to change the initial value (a changed value of the initial value) for the partition relative values specified in the partition conditions.

Next, description will be made on the execution procedure and details of a processing request. As shown in FIG. 1, the processing request reception 301 accepts a processing request such as the retrieval request 311, the insertion request 312, the deletion request 313 or the like. The processing request reception 301 analyzes the processing request and carries out the retrieval/insertion/deletion execution 302.

The partition change trigger monitor 304 monitors the occurrence of the partition change execution trigger 422 (whether the trigger has occurred or not) registered in the partition change information 420. When detecting the occurrence of the partition change execution trigger, the partition change trigger monitor 304 executes a partition change. While referring to the partition change method 423 of the partition change information 420, the partition change execution 305 executes a partition change in accordance with the partition change method.

Figure 4:
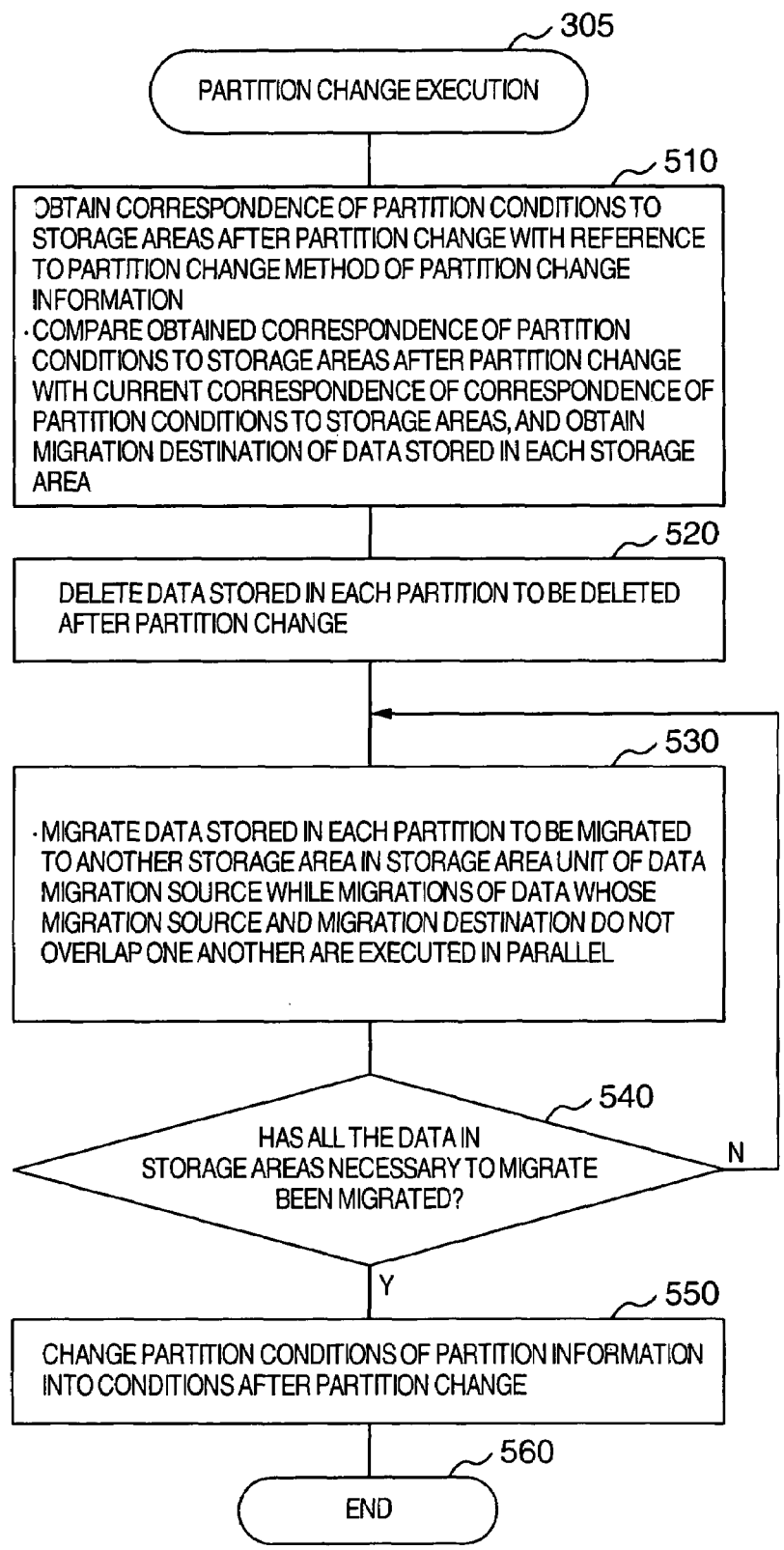
FIG. 4 is a flow chart showing the flow of processing for executing a partition change.

The details of the processing in the partition change execution 305 will be described with reference to FIG. 4. As shown in FIG. 4, first, the correspondence of partition conditions to storage areas after the partition change is obtained with reference to the partition change method 423 of the partition change information 420. Next, the obtained correspondence of partition conditions to storage areas after the partition change is compared with the present correspondence of partition conditions to storages areas so as to obtain a migration destination of data stored in each storage area (Step 510). As a result of the comparison between the condition before the partition change and the condition after the partition change, partitions can be classified into partitions to be unchanged, partitions to be deleted after the partition change, partitions to migrate to another storage area, and partitions to be added after the partition change. First, for each partition to be deleted after the partition change, data stored in a storage area corresponding to the partition is deleted (Step 520). Next, data stored in each partition to migrate to another storage area is migrated. The migration of the data is executed in storage area unit of the data migration source. Incidentally, it is preferable that data whose migration source and migration destination do not overlap one another are migrated in parallel (Step 530). The processing of Step 530 is repeated till all the data in storage areas necessary to migrate are migrated completely (Step 540). After all the data have been migrated, the partition conditions of the partition information are changed into the conditions after the partition change (Step 550), and the routine of processing is terminated (Step 560).

Next, more specific description will be made on an example of processing according to this embodiment. With reference to FIG. 5, description will be made on the definitions of the partition information 410 and the partition change information 420 when a table is defined. As shown in FIG. 5, in the partition information 410, the range is divided, for example, by date. One year's data are stored in Area 1, three months' data are stored in each Area 2–5, and one month's data are stored in each Area 6–17. In the example shown in FIG. 5, of the table in which data are arranged, newer data are stored in a database area fragmented more finely. Each partition is, for example, specified by relative values using a variable x. Current partitioning is performed based on the initial value (415) of x that is 2001. The data are fragmented and stored in the database in such a manner that data in 2001 are stored in Area-1 702, data in January to March in 2002 are stored in Area-2 711, and data in April to June in 2002 are stored in Area-3 712, as shown in FIG. 6.

The partition change trigger monitor 304 shown in FIG. 6 refers to the partition change execution trigger 422 of the partition configuration information 420. Here, the date of December 31 is specified in the partition change execution trigger 422. Therefore, the partition change trigger monitor 304 executes a partition change as soon as the date of December 31 comes. As shown in FIG. 5, the initial value for the relative values is defined to be increased by +1 in the partition change method 423. Accordingly, in the partition change, data are fragmented and stored in such a manner that the data in 2002 are stored in Area-1 802, the data in January to March in 2003 are stored in Area-2 811, and the data in April to June in 2003 are stored in Area-3 812, as shown in FIG. 7.

Figure 8:
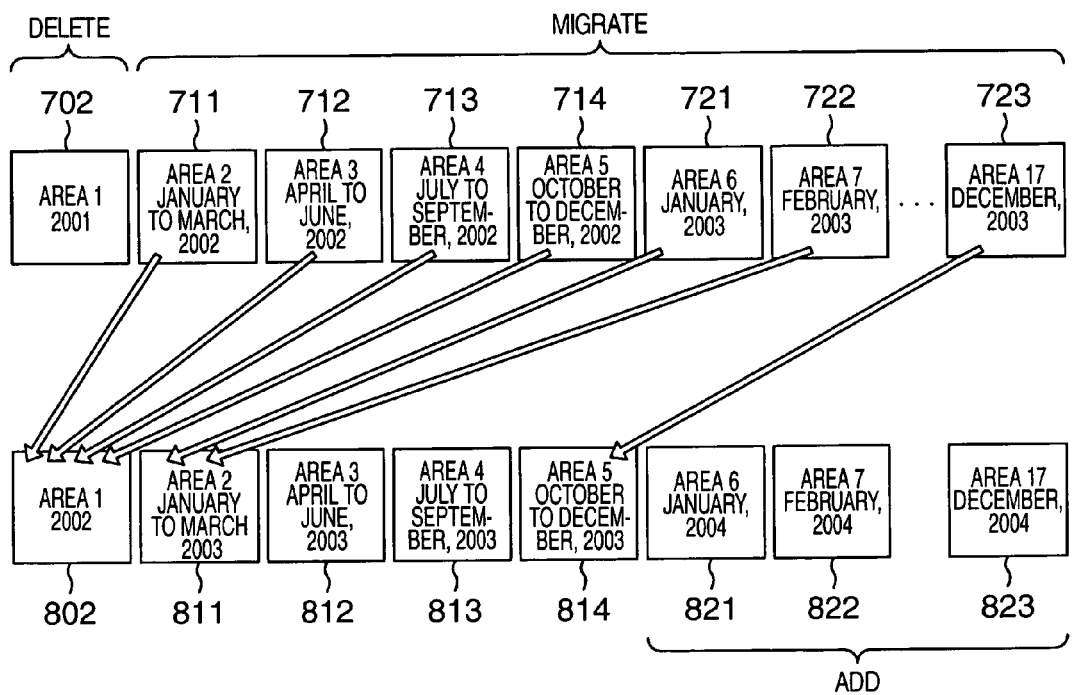
FIG. 8 is a diagram showing an example of area migration before and after the execution of a partition change.

FIG. 8 is a diagram showing the comparison of the correspondence of the partition conditions to the storage areas before the change with that after the change. As shown in FIG. 8, the data in 2001 stored in Area-1 702 before the change is deleted after the change because it has no migration destination. The data stored in Area-2 711, Area-3 712, Area-4 713 and Area-5 714 respectively before the change are migrated to Area-1 802 after the change. The data stored in Area-6 721, Area-7 722 and Area 8 respectively before the change are migrated to Area-2 811 after the change. Similarly, the data stored in Areas 9 to 11 respectively before the change are migrated to Area-3 812 after the change, the data stored in Areas 12 to 14 respectively before the change are migrated to Area-4 813 after the change, and the data stored in Areas 15 to 17 respectively before the change are migrated to Area-5 814 after the change.

A detailed example of the migration processing will be described also with reference to FIGS. 9A to 9D. First, the data in 2001 stored in Area-1 702 is deleted (FIG. 9A), and the data in Area-2 711, Area-3 712, Area-4 713 and Area-5 714 are migrated to Area-1 802. The migration is performed in area unit. Therefore, the data migration is performed in such an order that the data in Area 2 is first migrated to Area 1 (see FIG. 9B), and the data in Area 3 is next migrated to Area 1. When the data migration of Area 2 is completed, Areas 6 to 8 can be migrated to Area 2. Thus, data migration to Area 2 can be performed in parallel with data migration to Area 1 (see FIG. 9C).

Similarly, when the data migration to Area 3 is completed, data in Areas 9 to 11 can be migrated to Area 3. Thus, data migration to Area 3 can be performed in parallel with data migration to Areas 1 and 2.

When a plurality of pieces of data in the database are migrated during data migration, convergence in data migration processing can be reduced by defining the migration method to prevent any migration source from overlapping any migration destination. That is, when all the data migrations that can be executed in parallel are executed in parallel (see FIG. 9D), the data migrations can be performed efficiently. After the data transfer processing is performed completely by such processing performed repeatedly, the partition information is replaced by information after the change.

As described above, when a trigger and a method for changing the partition definition information are defined at the time of defining a table, the occurrence of the trigger can be detected automatically, and a specified partition change can be performed automatically. In addition, as for migration of data among storage areas during partition change, data migrations in which any migration source area does not overlap any migration source area are executed in parallel. Thus, the data migrations can be processed at a high speed and efficiently.

Figure 10:
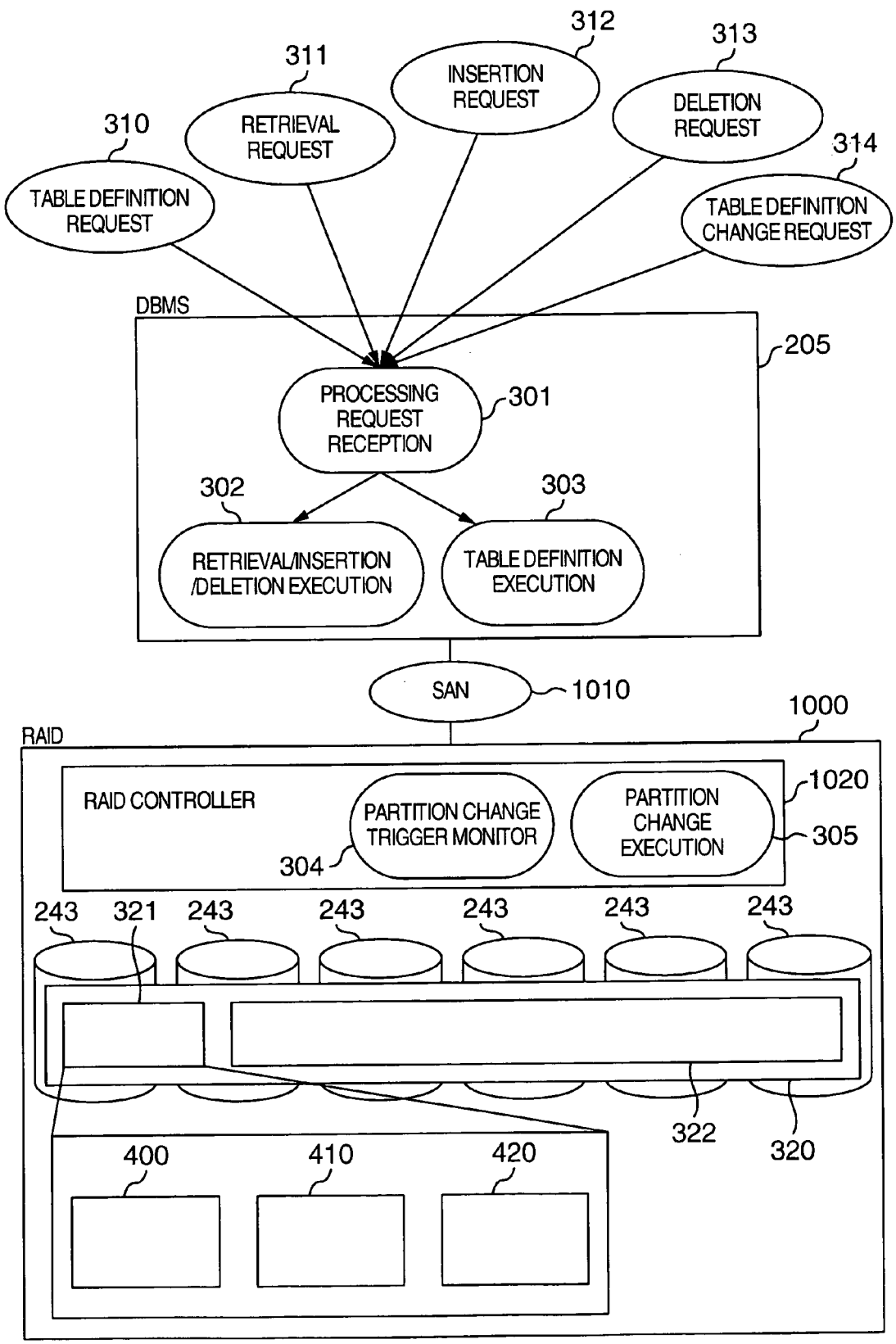
FIG. 10 is a diagram showing an example of the configuration of a database management system according to a second embodiment of the present invention, which is applied to a disk array device.

Next, with reference to the drawings, description will be made on a second embodiment of the present invention in which the database partitioning/storing technique according to the first embodiment of the present invention is applied to a disk array device. FIG. 10 is a diagram showing an example of the overall configuration in which a disk array device according to the second embodiment of the present invention is applied to a DBMS. As shown in FIG. 10, in a database partitioning system according to this embodiment, a DBMS 205 and a disk array (RAID: Redundant Arrays of Inexpensive Disks) device 1000 are connected via a storage area network (SAN) 1010. Upon acceptance of a processing request such as a table definition request 310, a retrieval request 311, an insertion request 312, a deletion request 313, a table definition change request 314 or the like through a processing request reception 301, the DBMS 205 analyzes the accepted request and executes requested processing. For example, upon acceptance of the table definition request 310 or the table definition change request 314, the DBMS 205 analyzes the accepted request and carries out a requested table definition execution 303. Upon acceptance of the retrieval request 311, the insertion request 312 or the deletion request 313, the DBMS 205 analyzes the accepted request and executes a requested retrieval/insertion/ deletion execution 302. The DBMS 205 can accept a plurality of execution requests 410 simultaneously and carry out processing executions for the requests.

A partition change trigger monitor 304 is operated by a RAID controller 1020 so as to monitor the occurrence of a partition change execution trigger 422 established at the time of defining a table. When the partition change execution trigger is detected, a specified partition change is executed by a partition change execution 305.

DB data 320 is stored in disk units 243 in the RAID device 1000. The DB data 320 includes DB information 321 and table data 322. The table data 322 stores data stored in the DBMS 205 in accordance with an insertion request.

Figure 11:
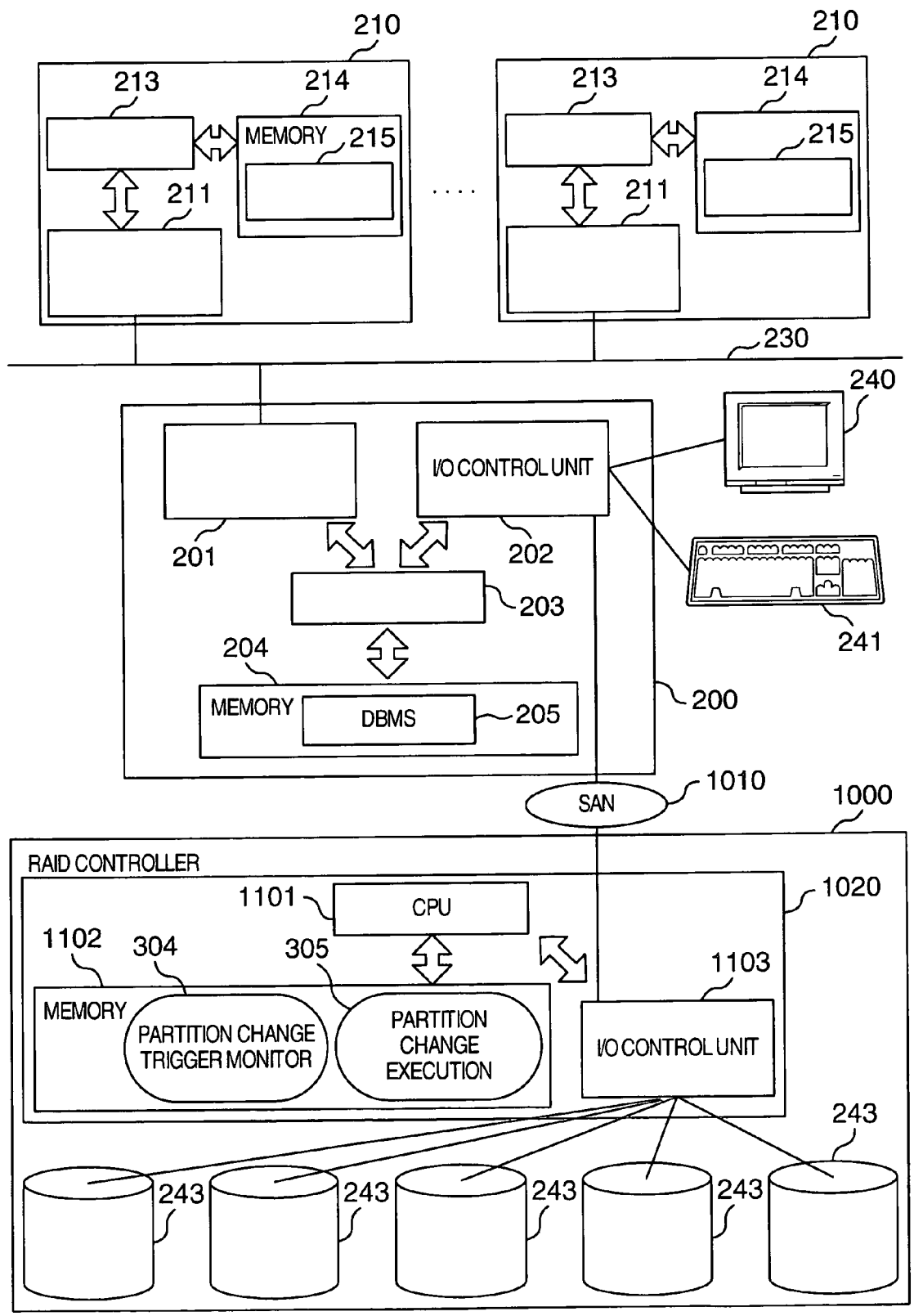
FIG. 11 is a diagram showing an example of the hardware configuration of the database management system depicted in FIG. 10.

FIG. 11 is a diagram showing the hardware configuration of this embodiment. As shown in FIG. 11, an information processing apparatus 200 is constituted by a CPU 203, a memory 204, an I/O control unit 202 and a communication control unit 201. The CPU 203 executes a program of the DBMS 205 stored in the memory 204 so as to perform processing on the DBMS 205. Reading/writing data from/ into the RAID device 1000 connected to the information processing apparatus 200 through the SAN 1010 is performed by the I/O control unit 202. Transmitting/receiving data to/from another information processing apparatus 210 connected via a network 230 is performed by the communication control unit 201. In addition, a command to start/ stop the DBMS 205 is carried out using a monitor 240 and a keyboard 241 connected to the I/O control unit 202.

When the DB access application (a, b) 215 issues a query request to the DBMS 205, the DBMS 205 executes processing in accordance with the query request. If there is a necessity of gaining access to the DB data 320, the DBMS 205 gains access to the DB data 320 stored in the RAID device 1000 through the I/O control unit 202.

The RAID device 1000 controls the disk units 243 through the RAID controller 1020 constituted by a CPU 1101, a memory 1102 and an I/O control unit 1103. In the RAID controller 1020, the partition change trigger monitor 304 and the partition change execution 305 are executed.

With reference to FIG. 10 and FIG. 3 et seq., the processing of the database system according to this embodiment will be described in accordance with each function. First, description will be made on a table definition execution. As shown in FIG. 10, the processing request reception 301 accepts the table definition request 310 or the table definition change request 314, analyzes the accepted processing request and carries out a table definition execution 303. In the table definition execution 303, table configuration information 400, partition information 410 and partition change information 420 are registered or changed in the DB information 321 of the DB data 320. The table configuration information 400 stores basic information constituting a table, such as a table name 401, column names 402 and column type information 403. The partition information 410 stores a table partitioning method 412, partition conditions 413 and partitioned data storage area information 414. The partition conditions stores conditions of partitions specified by relative values. An initial value for the relative values is stored in initial value information.

The partition change information 420 stores a partition change execution trigger 422 and a partition change method 423. The partition change execution trigger 422 stores a trigger such as specified date and hour, an occasion where a specified storage area is full or an occasion where all the data in a specified storage area are deleted. The partition change method 423 stores a changed value of the initial value for the relative values of the partitions specified in the partition conditions.

Next, description will be made on the execution of a processing request. As shown in FIG. 10, the processing request reception 301 accepts a processing request such as the retrieval request 311, the insertion request 312, the deletion request 313 or the like. The processing request reception 301 analyzes the accepted processing request and carries out the retrieval/insertion/deletion execution 302. In addition, the partition change trigger monitor 304 operated by the RAID controller of the RAID device monitors the occurrence of the partition change execution trigger 422 registered in the partition change information 420. When detecting the occurrence of the partition change execution trigger, the partition change trigger monitor 304 carries out a partition change execution 305. While referring to the partition change method 423 of the partition change information 420, the partition change execution 305 executes a partition change in accordance with the partition change method.

The details of the processing in the partition change execution 305 will be described with reference to FIG. 4. As shown in the flow chart of FIG. 4, first, the correspondence of partition conditions to storage areas after the partition change is obtained with reference to the partition change method 423 of the partition change information 420. Next, the obtained correspondence of partition conditions to storage areas after the partition change is compared with the current correspondence of partition conditions to storages areas so as to obtain a migration destination of data stored in each storage area (Step 510). As a result of the comparison between the condition before the partition change and the condition after the partition change, partitions can be classified into partitions to be unchanged, partitions to be deleted after the partition change, partitions to migrate to another storage area, and partitions to be added after the partition change. First, for each partition to be deleted after the partition change, data stored in a storage area corresponding to the partition is deleted (Step 520).

Next, data stored in each partition to migrate to another storage area is migrated. The migration of the data is executed in storage area unit of the data migration source while data whose migration source and migration destination do not overlap one another are migrated in parallel (Step 530). The processing of Step 530 is repeated till all the data in storage areas necessary to migrate are migrated completely (Step 540). After all the data have been migrated, the partition conditions of the partition information are changed into the conditions after the partition change (Step 550).

A more specific example will be described below. Description will be made on a table which is used for defining a table and in which the partition information 410 and the partition change information 420 have been defined as shown in FIG. 5. In this table, the range is divided by date. One year's data are stored in Area 1, three months' data are stored in each Area 2–5, and one month's data are stored in each Area 6–17. Each partition is specified by relative values using a variable x. Current partitioning is performed based on the initial value of x that is 2001. The data are fragmented and stored in such a manner that data in 2001 are stored in Area-1 702, data in January to March in 2002 are stored in Area-2 711, and data in April to June in 2002 are stored in Area-3 712, as shown in FIG. 12. The partition change trigger monitor 304 refers to the partition change execution trigger 422 of the partition configuration information 420. Here, the date of December 31 is specified in the partition change execution trigger 422. Therefore, the partition change trigger monitor 304 executes a partition change as soon as the date of December 31 comes.

As shown in FIG. 5, the initial value for the relative values is defined to be increased by +1 in the partition change method 423. Accordingly, in the partition change, data are fragmented and stored in such a manner that the data in 2002 are stored in Area-1 802, the data in January to March in 2003 are stored in Area-2 811, and the data in April to June in 2003 are stored in Area-3 812, as shown in FIG. 13.

FIG. 8 is a diagram showing the comparison of the correspondence of the partition conditions to the storage areas before the change with that after the change. The data in 2001 stored in Area-1 702 before the change is deleted after the change because it has no migration destination. The data stored in Area-2 711, Area-3 712, Area-4 713 and Area-5 714 respectively before the change are migrated to Area-1 802. The data stored in Area-6 721, Area-7 722 and Area 8 respectively before the change are migrated to Area-2 811. Similarly, the data stored in Areas 9 to 11 respectively are migrated to Area-3 812, the data stored in Areas 12 to 14 respectively are migrated to Area-4 813, and the data stored in Areas 15 to 17 respectively are migrated to Area-5 814.

Figure 9A:
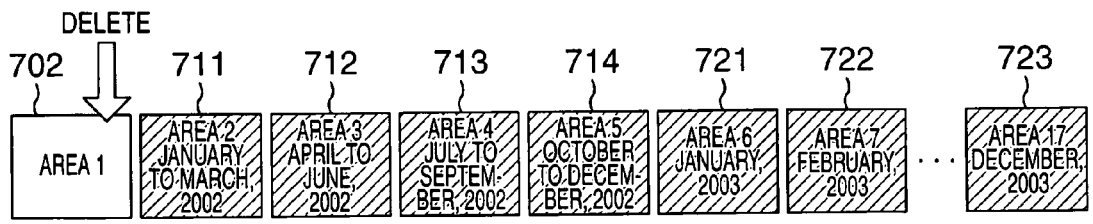
FIGS. 9A–9D are diagrams showing a sequence of processing for executing data transfer.
Figure 9B:
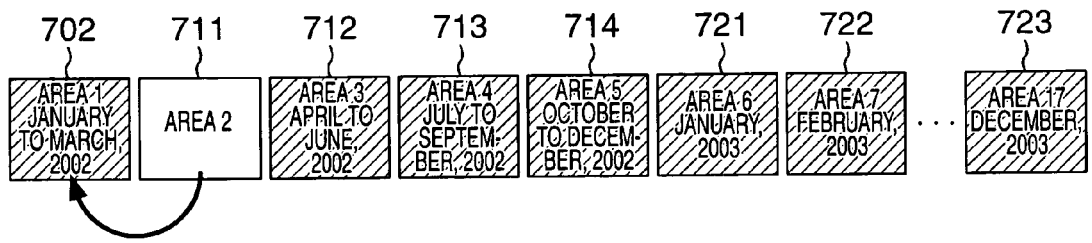
Figure 9C:
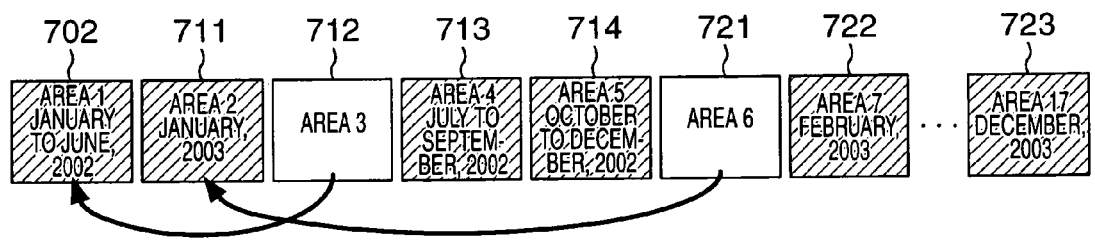
Figure 9D:
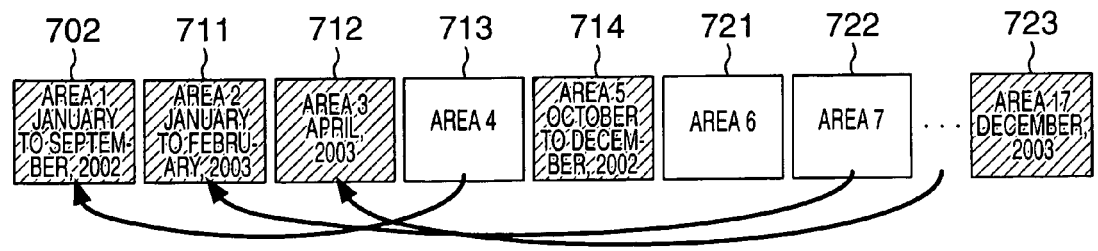

In the migration processing, first, the data in 2001 stored in Area-1 702 is deleted as shown in FIG. 9A, and the data in Area-2 701, Area-3 712, Area-4 713 and Area-5 714 are migrated to Area-1 802. The migration is performed in area unit. Therefore, the data migration is performed in such an order that the data in Area 2 is first migrated to Area 1 as shown in FIG. 9B, and the data in Area 3 is next migrated to Area 1. When the data migration of Area 2 is completed, data in Areas 6 to 8 are allowed to migrate to Area 2. Thus, migration to Area 2 is carried out in parallel with migration to Area 1 as shown in FIG. 9C. Similarly, when the data migration to Area 3 is completed, data in Areas 9 to 11 are allowed to migrate to Area 3. Thus, it is preferable that migration to Area 3 is performed in parallel with migration to Areas 1 and 2. In such a manner, it is preferable that all the data migrations that can be executed in parallel are executed in parallel as shown in FIG. 9D. After all the data are transferred by such processing performed repeatedly, the partition information is replaced by information after the change.

An embodiment in which the present invention is applied to a Network Attached Storage (NAS) device in the same manner will be described in detail with reference to the drawings.

Figure 14:
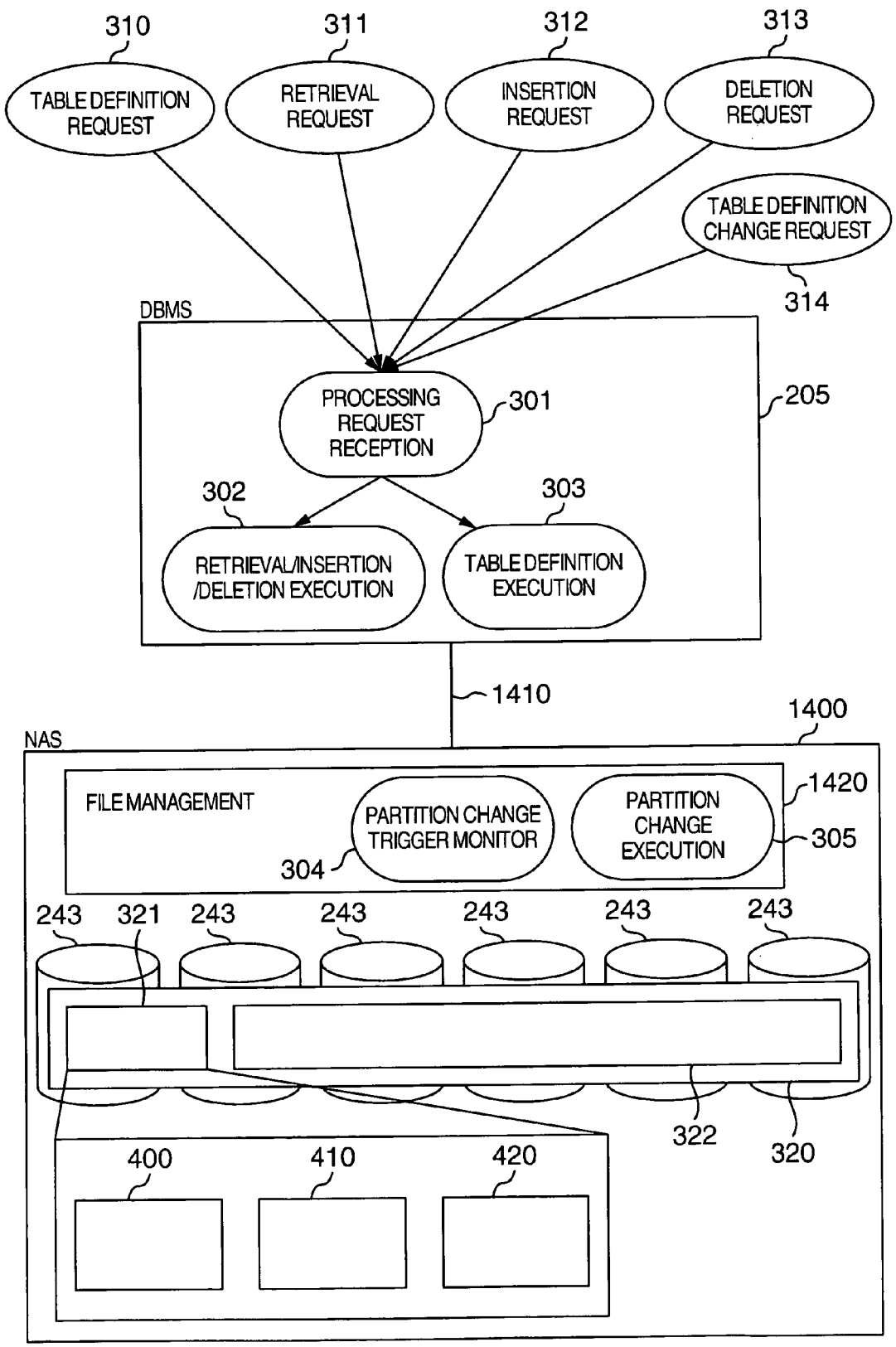
FIG. 14 is a diagram showing an example of the configuration of a database management system according to a third embodiment of the present invention, which is applied to a NAS device.

Description will be made below on an embodiment of the database partitioning/storing technique according to the present invention, in which a Network Attached Storage (NAS) device is applied to a DBMS. FIG. 14 is a diagram showing an example of the overall configuration in which a NAS device is applied to a DBMS. As shown in FIG. 14, a database system according to this embodiment includes a DBMS 205 and a NAS device 1400, which are connected via a network 1410. A configuration similar to that of the DBMS in the case where the present invention is applied to a disk array device as described above can be used for the DBMS 205.

A partition change trigger monitor 304 operates in a file management 1420 in the NAS device 1400 so as to monitor the occurrence of a partition change execution trigger 422 established at the time of defining a table as shown in FIG. 3. When the partition change execution trigger 422 is detected, a specified partition change is executed by a partition change execution 305.

Figure 15:
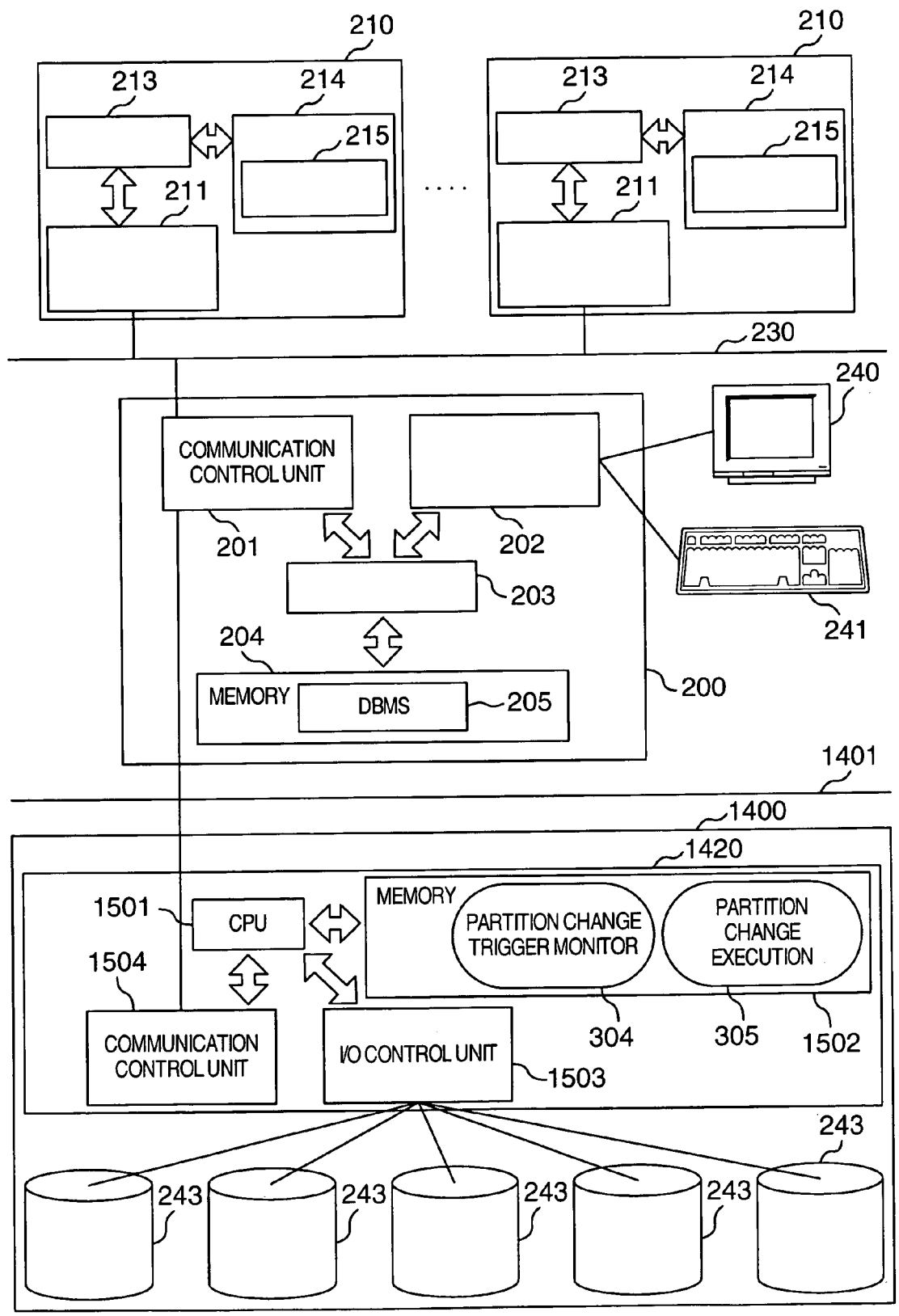
FIG. 15 is a diagram showing an example of the hardware configuration of the database management system depicted in FIG. 14.

DB data 320 are stored in disk units 243 in the NAS device 1400. The DB data 320 includes DB information 321 and table data 322. The table data 322 stores data stored in the DBMS 205 in accordance with an insertion request. As for the hardware configuration of this embodiment, as shown in FIG. 15, an information processing apparatus 200 includes a CPU 203, a memory 204, an I/O control unit 202 and a communication control unit 201. The CPU 203 executes a program of the DBMS 205 stored in the memory 204 so as to perform processing on the DBMS 205. Reading/writing data from/into the NAS device 1400 connected via the network 1410 is performed by the communication control unit 201. Transmitting/receiving data to/from another information processing apparatus 210 connected via a network 230 is performed by the I/O control unit 202. In addition, a command to start/stop the DBMS 205 is carried out using a monitor 240, a keyboard 241 and so on connected to the I/O control unit 202.

When a DB access application (a, b) 215 issues a query request to the DBMS 205, the DBMS 205 executes processing in accordance with the query request. If there is a necessity of gaining access to DB data 320, the DBMS 205 gains access to the DB data 320 stored in the NAS device 1400 through the communication control unit 201.

The NAS device 1400 includes a CPU 1501, a memory 1502, an I/O control unit 1503 and a communication control unit 1504, and controls the disk units 243 through a file management. In the file management, a partition change trigger monitor 304 and a partition change execution 305 are performed. The processing procedure of the database system according to this embodiment is similar to that in the aforementioned case where the present invention is applied to a disk array device.

As described above, when a trigger and a method for changing the partition definition information are defined at the time of defining a table, the occurrence of the trigger can be detected automatically, and a specified partition change can be performed automatically. In addition, as for migration of data among storage areas during the partition change, data whose migration source and migration destination do not overlap one another are migrated in parallel. Thus, the data migrations can be processed at a high speed and efficiently.

Incidentally, examples in which database management systems according to the embodiments are applied to a RAID device and a NAS device respectively have been described. However, the present invention can be applied to systems other than the database systems if a trigger and a method for changing partition definition information can be defined.

For example, in a storage management system for virtualizing and managing a plurality of storage devices connected to a SAN, a partition change trigger monitor function and a partition execution function can be applied to a storage management portion. By the storage management portion, partition change processing can be performed on data fragmented and stored in storage areas secured by the plurality of storage devices.

According to the present invention, a trigger and a method for changing partition definition information are defined in advance. When the occurrence of the trigger is detected by the DBMS, a specified partition change is performed automatically. Accordingly, the burden imposed on a user can be lightened. In addition, as for migration of data among the storage areas, data whose migration source area and migration source area do not overlap one another are migrated in parallel. Thus, the data migrations can be processed at a high speed.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A database storing management method comprising the steps of:
storing data in a plurality of storage areas under predetermined partition conditions defining separation of the data among the plurality of storage areas, the data being arranged to be separated and stored in the plurality of storage areas in such a manner that newer data are stored in different areas than older data according to said predetermined partition conditions, wherein said predetermined partition conditions include an access frequency of the data defined in accordance with a year in which the data was stored, such that the access frequency determines both a fineness of the stored data and a load for processing the stored data for each of the plurality of storage areas;
storing a partition change trigger upon which a relationship between the data and the plurality of storage areas changes,
storing a partition change condition with which the relationship changes;
monitoring a trigger state of said partition change trigger;
detecting an occurrence of the partition change trigger;
executing a change of data stored in each of the plurality of storage areas based on said partition change condition when said partition change trigger is detected,
wherein said step of executing said change of data includes the steps of:
obtaining a correspondence of partition conditions to the plurality of storage areas after said relationship change with reference to said partition change condition;
comparing said correspondence with a current correspondence of partition conditions to the storage areas so as to obtain a migration destination of the data stored in each of the plurality of storage areas;
classifying partitions defined by said partition conditions into a first partition classification of partitions to be unchanged, a second partition classification of partitions to be deleted after said relationship change, a third partition classification of partitions to be migrated to a different storage area, and a fourth partition classification of partitions to be added after said relationship change;
deleting data of said second partition classification from each data storage area corresponding thereto;
migrating data of said third partition classification from a migration source data storage area to a migration destination data storage area corresponding to said second partition classification; and
changing the partition change condition,
wherein said step of migrating data includes the step of:
simultaneously executing a plurality of migrations of data, when a plurality of data migrations are required, for any migration source data storage areas or any migration destination data storage areas that do not overlap with each other.

2. The database storing management method according to claim 1,
wherein the predetermined partition conditions include days during which data is accumulated; and
wherein said partition change trigger is selected from a group consisting of an occasion where a storage area is full, an occasion where all the data stored in a storage area are deleted, a predetermined date and hour, and a predetermined number of elapsed days and hours.

3. A database storing management program for allowing a computer to execute the functions of:
storing data in a plurality of storage areas under predetermined partition conditions defining separation of the data among the plurality of storage areas, the data being arranged to be separated and Stored in the plurality of storage areas in such a manner that newer data are stored in different areas than older data according to said predetermined partition conditions, wherein said predetermined partition conditions include an access frequency of the data defined in accordance with a year in which the data was stored, such that the access frequency determines both a fineness of the stored data and a load for processing the stored data for each of the plurality of storage areas;
storing a partition change trigger upon which a relationship between the data and the plurality of storage areas changes,
storing a partition change condition with which the relationship changes;
monitoring a trigger state of said partition change trigger;
detecting an occurrence of the partition change trigger;
executing a change of data stored in each of the plurality of storage areas based on said partition change condition when said partition change trigger is detected,
wherein said step of executing said change of data includes the steps of:

obtaining a correspondence of partition conditions to the plurality of storage areas after said relationship change with reference to said partition change condition;

comparing said correspondence with a current correspondence of partition conditions to the storage areas so as to obtain a migration destination of the data stored in each of the plurality of storage areas;

classifying partitions defined by said partition conditions into a first partition classification of partitions to be unchanged, a second partition classification of partitions to be deleted after said relationship change, a third partition classification of partitions to be migrated to a different storage area, and a fourth partition classification of partitions to be added after said relationship change;

deleting data of said second partition classification from each data storage area corresponding thereto;

migrating data of said third partition classification from a migration source data storage area to a migration destination data storage area corresponding to said second partition classification; and changing the partition change condition, wherein said step of migrating data includes the step of:

simultaneously executing a plurality of migrations of data, when a plurality of data migrations are required, for any migration source data storage areas or any migration destination data storage areas that do not overlap with each other.

4. A database system capable of partitioning and storing table data into a plurality of storage areas, comprising:

a database storing a table;

a database management system for managing said database; and an instruction control portion for giving said database management system an instruction to partition said table in said database;

wherein said instruction control portion makes control of the steps of:

storing data in a plurality of storage areas under predetermined partition conditions defining separation of the data among the plurality of storage areas, the data being arranged to be separated and stored in the plurality of storage areas in such a manner that newer data are stored in different areas than older data according to said predetermined partition conditions, wherein said predetermined partition conditions include an access frequency of the data defined in accordance with a year in which the data was stored, such that the access frequency determines both a fineness of the stored data and a load for processing the stored data for each of the plurality of storage areas;

storing a partition change trigger upon which a relationship between the data and the plurality of storage areas changes, storing a partition change condition with which the relationship changes;

monitoring a trigger state of said partition change trigger;

detecting an occurrence of the partition change trigger;

executing a change of data stored in each of the plurality of storage areas based on said partition change condition when said partition change trigger is detected, wherein said step of executing said change of data includes the steps of:

obtaining a correspondence of partition conditions to the plurality of storage areas after said relationship change with reference to said partition change condition;

comparing said correspondence with a current correspondence of partition conditions to the storage areas so as to obtain a migration destination of the data stored in each of the plurality of storage areas;

classifying partitions defined by said partition conditions into a first partition classification of partitions to be unchanged, a second partition classification of partitions to be deleted after said relationship change, a third partition classification of partitions to be migrated to a different storage area, and a fourth partition classification of partitions to be added after said relationship change;

deleting data of said second partition classification from each data storage area corresponding thereto;

migrating data of said third partition classification from a migration source data storage area to a migration destination data storage area corresponding to said second partition classification; and changing the partition change condition, wherein said step of migrating data includes the step of:

simultaneously executing a plurality of migrations of data, when a plurality of data migrations are required, for any migration source data storage areas or any migration destination data storage areas that do not overlap with each other.

5. A database system capable of partitioning and storing table data into a plurality of storage areas, comprising:

a database arranged in a disk array device and storing a table;

a database management system associated with said database and for managing said database;

a first instruction control portion provided in said disk array device and serving as an instruction control portion for giving said database management system an instruction to partition said table in said database; and a second instruction control portion provided in said database management system;

wherein said second instruction control portion makes control of the steps of:

storing data in a plurality of storage areas under predetermined partition conditions defining separation of the data among the plurality of storage areas, the data being arranged to be separated and stored in the plurality of storage areas in such a manner that newer data are stored in different areas than older data according to said predetermined partition conditions, wherein said predetermined partition conditions include an access frequency of the data defined in accordance with a year in which the data was stored, such that the access frequency determines both a fineness of the stored data and a load for processing the stored data for each of the plurality of storage areas;

storing a partition change trigger upon which a relationship between the data and the plurality of storage areas changes; and storing a partition change condition with which the relationship changes, while said first instruction control portion makes control of the steps of:

monitoring a trigger state of said partition change trigger;

detecting an occurrence of the partition change trigger; and executing a change of data stored in each of the plurality of storage areas based on said partition change condition when said partition change trigger is detected, wherein said step of executing said change of data includes the steps of:

obtaining a correspondence of partition conditions to the plurality of storage areas after said relationship change with reference to said partition change condition;

comparing said correspondence with a current correspondence of partition conditions to the storage areas so as to obtain a migration destination of the data stored in each of the plurality of storage areas;

classifying partitions defined by said partition conditions into a first partition classification of partitions to be unchanged, a second partition classification of partitions to be deleted after said relationship change, a third partition classification of partitions to be migrated to a different storage area, and a fourth partition classification of partitions to be added after said relationship change;

deleting data of said second partition classification from each data storage area corresponding thereto;

migrating data of said third partition classification from a migration source data storage area to a migration destination data storage area corresponding to said second partition classification; and changing the partition change condition, and wherein said step of migrating data includes the step of:

simultaneously executing a plurality of migrations of data, when a plurality of data migrations are required, for any migration source data storage areas or any migration destination data storage areas that do not overlap with each other.

6. A database system capable of partitioning and storing table data into a plurality of storage areas, comprising:

a database arranged in a NAS device and storing a table;

a database management system associated with said database and for managing said database;

a first instruction control portion provided in said NAS device and serving as an instruction control portion for giving said database management system an instruction to partition said table in said database; and a second instruction control portion provided in said database management system;

wherein said second instruction control portion makes control of the steps of:

storing data in a plurality of storage areas under predetermined partition conditions defining separation of the data among the plurality of storage areas, the data being arranged to be separated and stored in the plurality of storage areas in such a manner that newer data are stored in different areas than older data according to said predetermined partition conditions, wherein said predetermined partition conditions include an access frequency of the data defined in accordance with a year in which the data was stored, such that the access frequency determines both a fineness of the stored data and a load for processing the stored data for each of the plurality of storage areas, storing a partition change trigger upon which a relationship between the data and the plurality of storage areas changes, and storing a partition change condition with which the relationship changes, while said first instruction control portion makes control of:

monitoring a trigger state of said partition change trigger, detecting an occurrence of the partition change trigger, and executing a change of data stored in each of the plurality of storage areas based on said partition change condition when said partition change trigger is detected, wherein said step of executing said change of data includes the steps of:

obtaining a correspondence of partition conditions to the plurality of storage areas after said relationship change with reference to said partition change condition;

comparing said correspondence with a current correspondence of partition conditions to the storage areas so as to obtain a migration destination of the data stored in each of the plurality of storage areas;

classifying partitions defined by said partition conditions into a first partition classification of partitions to be unchanged, a second partition classification of partitions to be deleted after said relationship change, a third partition classification of partitions to be migrated to a different storage area, and a fourth partition classification of partitions to be added after said relationship change;

deleting data of said second partition classification from each data storage area corresponding thereto;

migrating data of said third partition classification from a migration source data storage area to a migration destination data storage area corresponding to said second partition classification; and changing the partition change condition, wherein said step of migrating data includes the steps of:

simultaneously executing a plurality of migrations of data, when a plurality of data migrations are required, for any migration source data storage areas or any migration destination data storage areas that do not overlap with each other.

7. A database partitioning control method comprising the steps of:

storing data in a plurality of storage areas classified into a plurality of storage conditions in a predetermined order, the storage conditions defining separation of the data among the plurality of storage areas, the data being arranged to be separated and stored in the plurality of storage areas in such a manner that newer data are stored in different areas than older data according to said storage conditions, wherein said storage conditions include an access frequency of the data defined in accordance with a year in which the data was stored, such that the access frequency determines both a fineness of the stored data and a load for processing the stored data for each of the plurality of storage areas;

further storing partition conditions including both a partition change condition with which a relationship between each of the storage areas and the data stored in the storage areas changes, and a condition change trigger upon which the relationship changes by moving data stored in a source storage area to a destination storage area;

monitoring an occurrence of said condition change trigger;

detecting the occurrence of the condition change trigger; and executing a change of data stored in each of the plurality of storage areas upon a detection of said condition change trigger in accordance with the partition change condition, data in a plurality of storage areas simultaneously being moved when there is no overlap of any of moving source storage areas or any of moving destination storage areas.

8. A database storing management method, comprising the steps of: storing data accumulated on a day-basis in three kinds of storage areas under predetermined partition conditions defining separation of the data among the three kinds of storage areas, a first kind of storage area being for each month of a year at present, a second kind of storage area being for each quarter of a year just before the year at present, and a third kind of storage area being for an entirety of a year that was two years before the year at present, so that the data are arranged to be separated and stored in the three kinds of storage areas in such a manner that newer data are stored in different areas than older data according to said predetermined partition conditions, wherein said predetermined partition conditions include an access frequency of the data defined in accordance with a year in which the data was stored, such that the access frequency determines both a fineness of the stored data and a load for processing the stored data for each of the three kinds of storage areas;

storing a change trigger data upon which a relationship between the data stored in each of the storage areas and the kinds of the storage areas changes by moving data in a source storage area to a destination storage area;

monitoring an occurrence of trigger due to the change trigger data, the trigger being a last date of the year at present;

detecting the trigger; and performing a change of data stored in each of the three kinds of storage areas when the trigger is detected, including deleting the data in the third kind of storage area, moving the data in the second kind of storage area to the third kind of storage area, and moving the data in the first kind of storage area to the second kind of storage area, the data in any of the three kinds of storage areas simultaneously being moved when there is no overlap of any moving source storage areas or any moving destination storage areas.

9. A database storing management system comprising:

a first storing device for storing data accumulated on a day-basis in three kinds of storage areas under predetermined partition conditions defining separation of the data among the three kinds of storage areas, a first kind of storage area being for each month of a year at present, a second kind of storage area being for each quarter of a year just before the year at present, and a third kind of storage area being for an entirety of a year that was two years before the year at present, so that the data are arranged to be separated and stored in the three kinds of storage areas in such a manner that newer data are stored in different areas than older data according to said predetermined partition conditions, wherein said predetermined partition conditions include an access frequency of the data defined in accordance with a year in which the data was stored, such that the access frequency determines bath a fineness of the stored data and a load for processing the stored data for each of the three kinds of storage areas;

a second storing device for storing a change trigger data upon which a relationship between the data stored in each of the storage areas and the kinds of the storage areas changes by moving data in a source storage area to a destination storage area;

a monitoring device for monitoring and detecting an occurrence of a trigger due to the change trigger data; and a controlling device for controlling the data having been stored in each of the three kinds of storage areas so as to be changed in response to the trigger in such a manner that data having been stored in the third kind of storage area is deleted, data having been stored in the second kind of storage area is moved to the third kind of storage area, and data in the first kind of storage area is moved to the second kind of storage area, the data in any of the three kinds of storage areas simultaneously being moved when there is no overlap of any moving source storage areas or any moving destination storage areas.

10. The database storing management method according to claim 1, wherein the predetermined partition conditions relate to days during which the data is accumulated, and wherein said partition change trigger is selected from a group consisting of an occasion where a storage area is full, an occasion where all the data having been stored in a storage area are deleted, a predetermined date and hour, and a predetermined amount of lapsed elapsed days and hours.

11. The database storing management method according to claim 1, wherein the predetermined partition conditions relate to days during which the data is accumulated, and wherein said partition change trigger is selected from a group consisting of occasions where a storage area is full, an occasion where all the data having been stored in a storage area are deleted, a predetermined date and hour, and a predetermined amount of lapsed days and hours.

12. A database storing management method comprising the steps of:

storing data accumulated on a day-basis in three kinds of storage areas, a first kind of storage area being for each month of a year at present, a second kind of storage area being for each quarter of a year just before the year at present, and a third kind of storage area being for an entirety of a year that was two years before the year at present, so that the data are arranged to be stored in such a manner that newer data are stored in different areas than older data are stored, storage of data for each of the storage areas being based on an access frequency of the data defined in accordance with a year in which the data has been stored;

further storing change trigger data upon which a relationship between the data stored in each of the storage areas and the kinds of the storage areas changes by moving data in a source storage area to a destination storage area;

monitoring and detecting an occurrence of a trigger due to the change trigger data; and controlling data having been stored in each of the storage areas so as to be changed in response to the trigger in such a manner that data stored in the third kind of storage area is deleted, data stored in the second kind of storage area is moved to the third kind of storage area, and data in the first kind of storage area is moved to the second kind of storage area, the data in any of the storage areas simultaneously being moved when there is no overlap of any moving source storage areas or any moving destination storage area.

13. A database storing management system comprising:

a first storing device for storing data accumulated on a day-basis in three kinds of storage areas, a first kind of storage area being for each month of a year at present, a second kind of storage area being for each quarter of a year just before the year at present, and a third kind of storage area being for an entirety of a year that was two years before the year at present so that the data are arranged to be stored in such a manner that newer data are stored in different areas than older data are stored, storage of data for each of the storage areas being based on an access frequency of the data defined in accordance with a year in which the data has been stored;

a second storing device for storing change trigger data on a last date of the year at present upon which a relationship between the data stored in each of the storage areas and the kinds of the storage areas changes by moving data in a source storage area to a destination storage area;

a timer unit for monitoring and detecting the last date of the year at present as a trigger due to the change trigger data; and a controller for controlling data having been stored in each of the storage areas so as to be changed in response to the trigger in such a manner that data stored in the third kind of storage area is deleted, data in the second kind of storage area is moved to the third kind of storage area, and data in the first kind of storage area is moved to the second kind of storage area, the data in any of the storage areas simultaneously being moved when there is no overlap of any moving source storage areas or any moving destination storage area.

\* \* \* \* \*